United States Patent
Miller, IV et al.

(10) Patent No.: US 11,262,588 B2
(45) Date of Patent: Mar. 1, 2022

(54) SPECTATOR VIEW OF VIRTUAL AND PHYSICAL OBJECTS

(71) Applicant: Magic Leap, Inc., Plantation, FL (US)

(72) Inventors: Thomas Marshall Miller, IV, Los Angeles, CA (US); Takashi Kuribayashi, Culver City, CA (US); John Monos, Venice, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/194,836

(22) Filed: Mar. 8, 2021

(65) Prior Publication Data

US 2021/0286179 A1    Sep. 16, 2021

Related U.S. Application Data

(60) Provisional application No. 62/987,517, filed on Mar. 10, 2020.

(51) Int. Cl.
| | |
|---|---|
| G02B 27/01 | (2006.01) |
| G06T 19/00 | (2011.01) |
| G06F 3/01 | (2006.01) |

(52) U.S. Cl.
CPC ......... *G02B 27/0172* (2013.01); *G06F 3/013* (2013.01); *G06T 19/006* (2013.01); *G02B 2027/0138* (2013.01)

(58) Field of Classification Search
CPC ........ G02B 2027/0138; G02B 27/0172; G06F 3/013; G06T 19/006
See application file for complete search history.

(56) References Cited

U.S. PATENT DOCUMENTS

| | | | | |
|---|---|---|---|---|
| 10,445,925 B2 * | 10/2019 | Tokubo | ................... | A63F 13/56 |
| 10,705,600 B2 * | 7/2020 | Skogo | ..................... | G06F 3/013 |
| 2016/0027218 A1 * | 1/2016 | Salter | ................... | G02B 27/017 |
| | | | | 345/633 |
| 2017/0266554 A1 * | 9/2017 | Marks | ................. | A63F 13/5255 |
| 2017/0269685 A1 * | 9/2017 | Marks | .................. | A63F 13/212 |
| 2017/0269713 A1 * | 9/2017 | Marks | ................... | G06F 3/0346 |
| 2017/0278306 A1 * | 9/2017 | Rico | ................... | G06F 3/04815 |
| 2017/0354875 A1 * | 12/2017 | Marks | ..................... | G06F 3/011 |
| 2018/0093186 A1 * | 4/2018 | Black | ................... | G06T 11/60 |
| 2018/0096533 A1 * | 4/2018 | Osman | .................. | G06T 15/60 |
| 2019/0102939 A1 * | 4/2019 | He | ........................ | A63F 13/355 |
| 2019/0304406 A1 * | 10/2019 | Griswold | ................. | G09G 5/14 |
| 2020/0209624 A1 * | 7/2020 | Sztuk | ..................... | G06F 3/011 |
| 2021/0150806 A1 * | 5/2021 | Guler | ................. | G06K 9/00201 |
| 2021/0183114 A1 * | 6/2021 | Corson | ................ | A63F 13/497 |
| 2021/0312887 A1 * | 10/2021 | Griswold | ................ | G06T 15/20 |

* cited by examiner

*Primary Examiner* — Dmitriy Bolotin
(74) *Attorney, Agent, or Firm* — Knobbe, Martens, Olson & Bear, LLP

(57) ABSTRACT

A user may interact and view virtual elements such as avatars and objects and/or real world elements in three-dimensional space in an augmented reality (AR) session. The system may allow one or more spectators to view from a stationary or dynamic camera a third person view of the users AR session. The third person view may be synchronized with the user view and the virtual elements of the user view may be composited onto the third person view.

20 Claims, 9 Drawing Sheets

SPECTATOR VIEW OF VIRTUAL AND PHYSICAL OBJECTS

CROSS-REFERENCE TO RELATED APPLICATIONS

This application claims the benefit of priority under 35 U.S.C. § 119(e) to U.S. Provisional Application No. 62/987,517, filed on Mar. 10, 2020, entitled "SPECTATOR VIEW OF VIRTUAL AND PHYSICAL OBJECTS," the disclosure of which is hereby incorporated by reference herein in its entirety.

TECHNICAL FIELD

The present disclosure relates to systems and methods to facilitate a spectator view of virtual and physical objects in a virtual, augmented or mixed reality environment.

BACKGROUND

Modern computing and display technologies have facilitated the development of systems for so called "virtual reality", "augmented reality", or "mixed reality" sessions, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human tactile and visual perception systems are very complex. Producing a VR, AR, or MR technology that facilitates a comfortable, natural-looking, rich presentation and interaction of virtual image elements, such as virtual avatars amongst other virtual or real-world imagery elements, to a user is challenging. Additionally, relaying the users VR, AR, or MR session to other spectators to view adds to the challenges of such technology. Systems and methods disclosed herein address various challenges related to VR, AR, and MR technology.

SUMMARY

Embodiments of the present disclosure are directed to systems and methods for facilitating a spectator view of virtual and physical objects in a virtual, augmented or mixed reality environment. As one example embodiment, one or more input devices (e.g., controllers) paired with a head-mounted display system may be used by a user to view and interact in a VR, AR, or MR session. Such sessions may include virtual elements such as virtual avatars (e.g., a graphical representation of a character and/or person) and objects (e.g., a graphical representation of a table, chair, painting and/or other object) in a three-dimensional space. The VR, AR, or MR session may be live streamed and/or recorded by one or more cameras (e.g., a spectator camera) to present a third person perspective of the session to one or more spectators on one or more display systems (e.g., monitors, tablets, phones, head-mounted display systems, among other display systems).

For ease of reading and understanding, certain systems and methods discussed herein refer to an augmented reality environment or other "augmented reality" or "AR" components. These descriptions of augmented reality" or "AR" should be construed to include "mixed reality," "virtual reality," "VR," "MR," and the like, as if each of those "reality environments" were specifically mentioned also.

Further details of features, objects, and advantages of the disclosure are described below in the detailed description, drawings, and claims. Both the foregoing general description and the following detailed description are exemplary and explanatory and are not intended to be limiting as to the scope of the disclosure.

BRIEF DESCRIPTION OF THE DRAWINGS

The following drawings and the associated descriptions are provided to illustrate embodiments of the present disclosure and do not limit the scope of the claims. The relative placement of features and elements may have been modified for the purpose of illustrative clarity. Where practical, the same or similar reference numbers denote the same or similar or equivalent structures, features, aspects, or elements, in accordance with one or more embodiments.

The drawings illustrate the design and utility of various embodiments of the present disclosure. It should be noted that the figures are not necessarily drawn to scale and that elements of similar structures or functions are represented by like reference numerals throughout the figures. Understanding that these drawings depict only example embodiments of the disclosure and are not therefore to be considered limiting of its scope, the disclosure will be described and explained with additional specificity and detail through the use of the accompanying drawings in which.

DETAILED DESCRIPTION

Overview

Figure 1A:
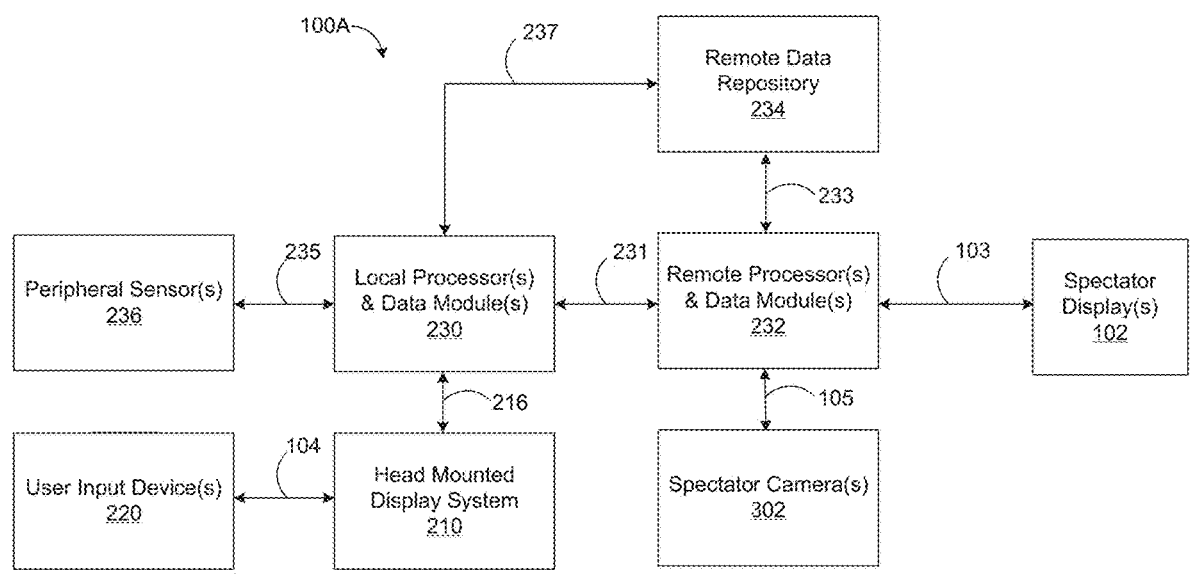
FIG. 1A is a block diagram illustrating one embodiment of an example system for providing a spectator view of virtual and physical objects.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

AR systems may display virtual content to a user during an AR session. For example, this content may be displayed on a head-mounted display system (e.g., as part of eyewear) that projects image information to the user's eyes. In addition, in an AR system, the display may also transmit light from the surrounding environment to the user's eyes, to allow a view of that surrounding environment. As used herein, a "head-mounted" or "head mountable" display system includes a display that may be mounted on the head of a user or spectator. Such displays may be understood to form parts of a display system. Further, AR display systems may include one or more user input devices such as a hand-held controller (e.g., a multi-degree of freedom game controller) to interact in the three-dimensional space during an AR session such as described herein.

However, spectators (e.g., observers of an AR session) may be limited in viewing the AR session of the user (e.g., the spectators may only view the user's first person head-mounted display perspective and interactions therein). In some embodiments, the spectators may be limited to viewing only the user's physical interactions with the physical environment but not the virtual environment (e.g., the spectators may see the user move around and interact but not see the virtual content the user is interacting with). Such view restrictions severely hinder the spectator's experience and ability to engage in and/or view the user's AR session as a whole.

Accordingly, described herein are systems and methods for providing outside spectators a view of virtual and physical (e.g., real-world) objects, including a user wearing an AR head-mounted display system and interactions of the user with virtual and physical objects within an AR environment. In one embodiment, one or more cameras (e.g., a spectator camera) may provide a third person a live streamed and/or recorded view of the physical interactions and/or movements of the user. Additionally, during the AR session, virtual elements (e.g., virtual avatars, virtual objects, etc.) may be composited onto the head mounted display first person view of the user. The same virtual elements from the view of the user may be synchronized, rendered, and composited onto the video feed from the spectator camera, after adjusting so that the virtual elements are rendered from the reference point of the spectator camera. The spectator may then view a third person synchronized composite view of the AR session which may further eliminate view restrictions to spectators. Various embodiments of the present technology described herein provide systems and methods to allow one or more spectators to view the AR session of the user including virtual avatars and objects from various perspectives (e.g., a third person perspective). Such systems and methods as further described herein provide a synchronized composite view of the AR session from a stationary or dynamic spectator camera to a spectator.

Additionally, various embodiments of the present technology described herein are further advantageous as the technology contains features related to video compositing, character rig data (e.g., virtual avatar skeletal data, eye gaze data, etc.) transmission, spatial camera position matching and localization, stationary and dynamic camera positioning and tracking, easy pluggable designs that may feed into existing three-dimensional workflows, among other features.

Example Block Diagram of System

FIG. 1A illustrates a block diagram 100A of an example system to facilitate a spectator view of virtual and physical objects in an augmented reality session.

The system may include a head-mounted display system 210, one or more user input devices 220, one or more local processors and data modules 230, one or more remote processors and data modules 232, a remote data repository 234, one or more peripheral sensors 236, one or more spectator cameras 302, and one or more spectator displays 102.

Figure 2A:
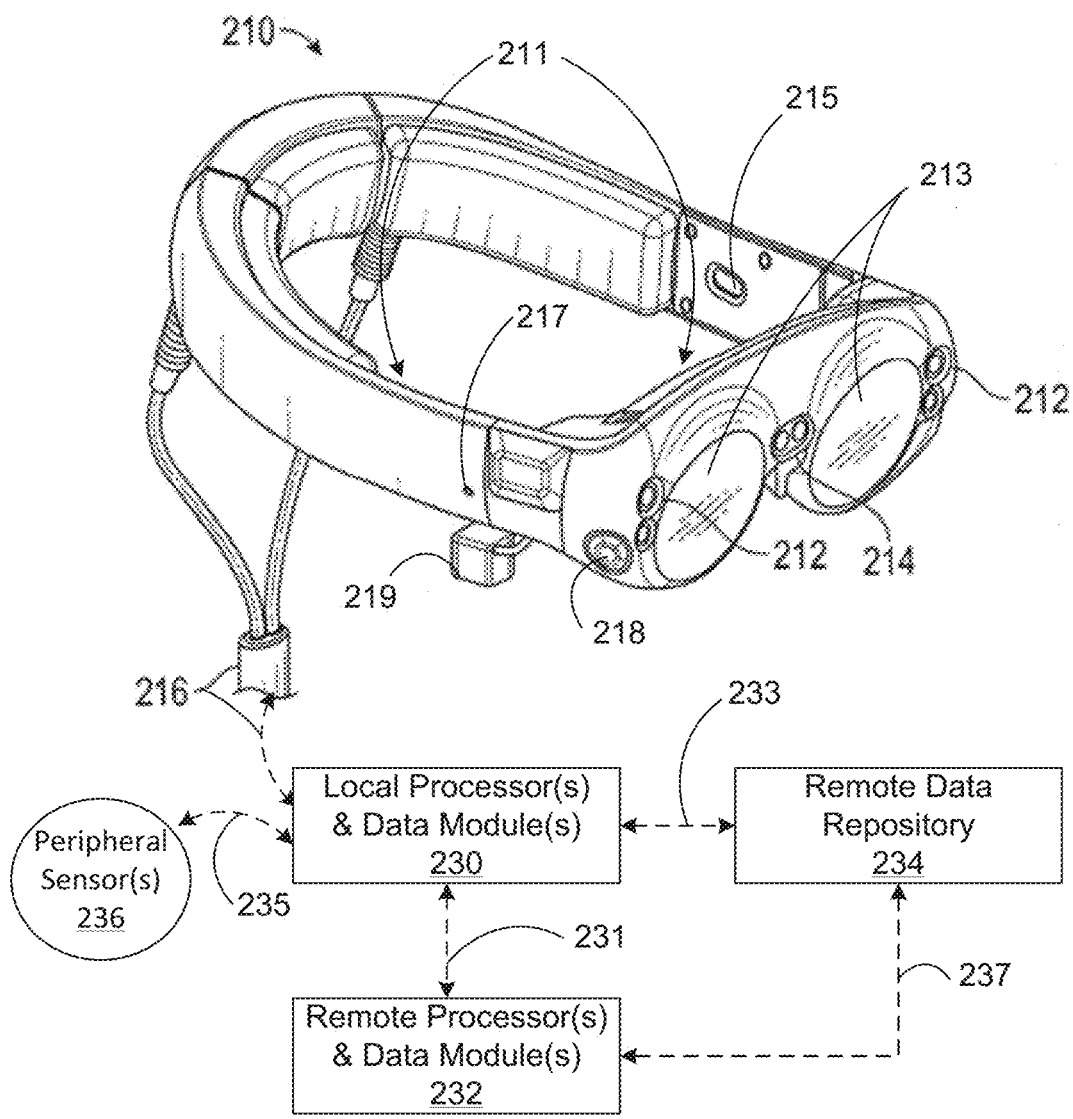
FIG. 2A illustrates one embodiment of an example head-mounted display system for simulating three-dimensional imagery in an augmented reality session.
Figure 2B:
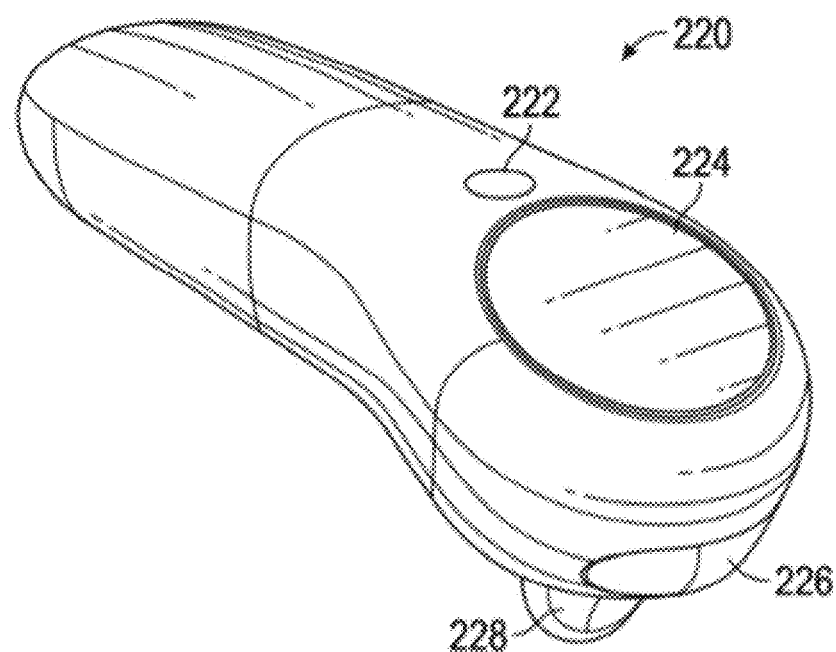
FIG. 2B illustrates one embodiment of an example user input device for interacting in an augmented reality session.

Examples of the head-mounted display system 210 and one or more user input devices 220 are illustrated in FIGS. 2A-B and disclosed further herein. The head-mounted display system 210 may be paired via a wireless and/or wired connection 104 to the one or more user input devices 220. In some embodiments, the connection 104 occurs via an electromagnetic emitter from the one or more user input devices 220 to an electromagnetic receiver from the head-mounted display system 210. The head-mounted display system 210 may be operatively coupled via a communications link 216 (e.g., a wired or wireless connectivity) to a local processor and data module 230. Similarly, the one or more peripheral sensors 236 may be operatively coupled via a communications link 235 (e.g., a wired or wireless connectivity) to the local processor and data module 230. Furthermore, the local processor and data module 230 may be operatively coupled by communication links 231, 233, 237 (e.g., wired or wireless connectivity) to the one or more remote processors and data modules 232 and remote data repository 234 such that these remote modules 232, 234 are operatively coupled to each other and available as resources to the one or more local processors and data modules 230.

The one or more remote processors and data modules 232 may be operatively coupled via a communications link 103 (e.g., a wired or wireless connectivity) to display an augmented reality session spectator view of one or more users to one or more spectator displays 102. Such spectator displays 102 may include monitors, televisions, tablets, phones, head-mounted display systems among other like spectator viewing displays. The spectator view may be a stationary view (e.g., a fixed-location view of the AR session in which the virtual elements are composited onto the live and/or recorded physical user interactions) or a dynamic view (e.g., a view that is moveable to capture multiple view points of the AR session in which the virtual elements are composited onto the live and/or recorded physical user interactions).

The one or more remote processors and data modules 232 may be operatively coupled via a communications link 105 (e.g., a wired or wireless connectivity) to receive video output of the one or more spectator cameras 302. In some embodiments, the communications link 105 uses serial digital interface (SDI) to interface between the one or more spectator cameras 302 and one or more remote processors and data modules 232. Further, in some embodiments, the one or more remote processors and data modules 232 uses a PCI-E Video and Audio I/O Card Interface with bi-directional SDI connection 103 to optimally live composite and synchronize the virtual elements (e.g., virtual avatars with associated character rig, eye gaze, motion capture, among other like virtual avatar data and/or virtual objects with associated position, orientation, shape among other like virtual object data) with the video stream. Additionally, these embodiments also enable spectators to easily visualize green-screened scenes combined with computer graphics (CG) (e.g., virtual avatars and virtual objects) in real-time. Examples of a spectator camera and/or spectator view are illustrated in FIGS. 3-6 and disclosed further herein.

Figure 1B:
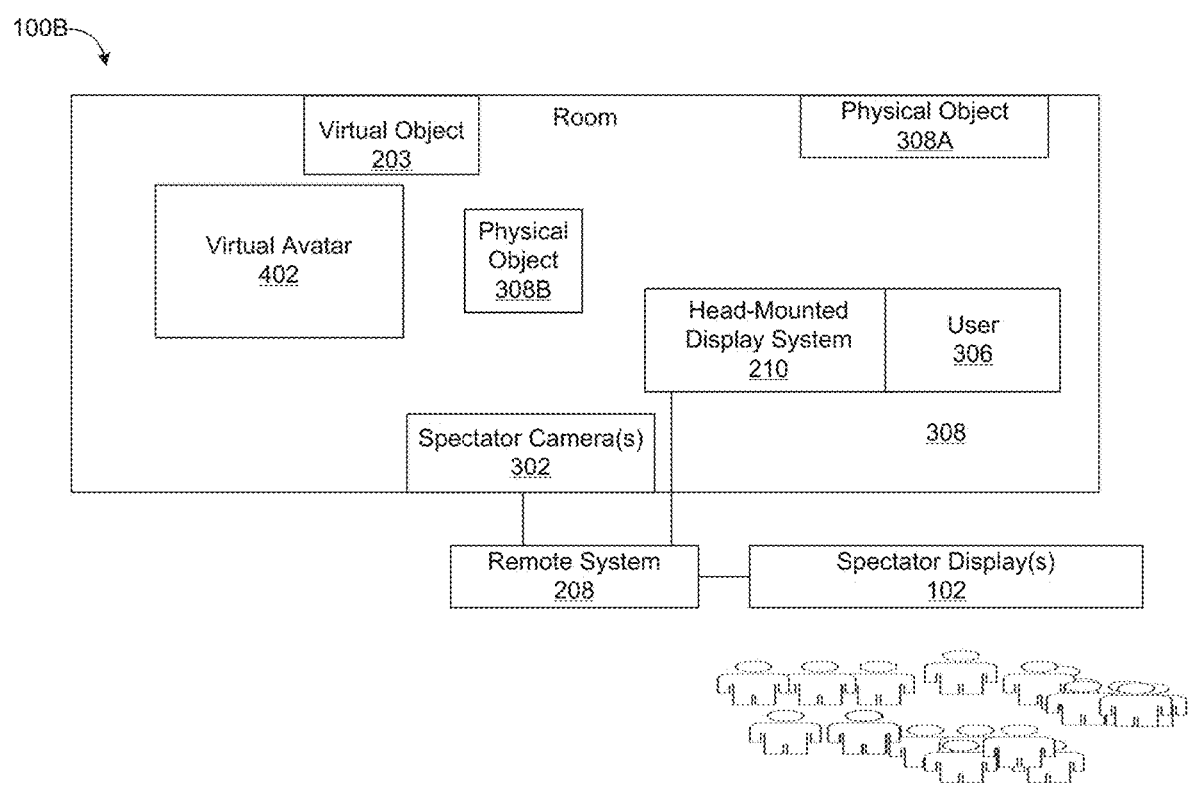
FIG. 1B illustrates an example top view of an environment wherein a spectator view of a user interacting with a virtual avatar is provided.

FIG. 1B is an example top view 100B of an environment wherein a spectator view of a user interacting with a virtual avatar is provided. In this example, the environment 308 is illustrated as a room, but in other implementations the environment 308 may include any other physical environment. The user 306, wearing a head-mounted display system 210, interacts with a virtual avatar 402. For example, the user 306 may see the virtual avatar 402 seated across from the user 306 at a table.

In the example of FIG. 1B, multiple physical objects are included in the environment 308, including physical object 308B, such as the table, and physical object 308A, such as a stool, bookshelf, painting, or other person, for example. One or more virtual objects 203 may also be included in the environment 308. Advantageously, a spectator camera 302 is positioned within the room to capture images of the physical objects within the environment 308, such as the user 306 and any other physical objects within the environment 308. The spectator camera 302 is in communication with a remote system 208 that is configured to provide a video feed to a spectator display 102 visible to one or more spectators.

In some embodiments, the remote system 208 may be located just outside the physical environment 308 (e.g., room). In some embodiments, the remote system 208 includes and/or is in communication with the remote data processors and data modules 232 and/or the remote data repository 234 (e.g., FIG. 1A and FIG. 2A). Thus, functions described herein with reference to the remote system 208 may be partially or fully performed by the remote system 208, the remote data processors and data modules 232, and/or the remote data repository 234.

In the example of FIG. 1B, the head-mounted display system 210 communicates with the remote system 208, such as via a local area network and/or wireless area network to provide information regarding the current attributes of the virtual avatar and virtual objects within the environment 308. The remote system 208 may then generate a composite of images from the spectator camera 302 and a representation of the virtual objects from the perspective of the spectator camera 302 (based on information received from the head-mounted display system 210). Accordingly, the spectator display 102 is configured to provide a view of the environment 308 that seamlessly combines real-world and virtual content.

Example User Input and Display Devices

FIG. 2A illustrates an example head-mounted display system 210 for simulating three-dimensional imagery in an augmented reality session. The head-mounted display system 210 may include various integrated waveguides and related systems as disclosed herein. The waveguide assembly may be part of a display 213. In some embodiments, the head-mounted display system 210 may include a stereoscopic display as the display 213.

With continued reference to FIG. 2A, the display 213 may be coupled to a frame 211, which is wearable by a user or viewer (e.g., the user 306 illustrated in FIGS. 3 and 5-6) and which is configured to position the display 213 in front of the eyes of the user 306. The display 213 may be considered eyewear in some embodiments. In some embodiments, a speaker 215 is coupled to the frame 211 and configured to be positioned near the ear of the user 306. In some embodiments, another speaker, may optionally be positioned near the other ear of the user 306 to provide stereo/shapeable sound control. The head-mounted display system 210 may also include one or more microphones 217 or other devices to detect sound. In some embodiments, the microphones 217 are configured to allow the user 306 to provide inputs or commands to the system 210 (e.g., the selection of voice menu commands, natural language questions, etc.), and/or may allow audio communication with other persons (e.g., with other users or spectators of similar display systems). The microphone may further be configured as a peripheral sensor to collect audio data (e.g., sounds from the user and/or environment). In some embodiments, the display system may also include one or more peripheral sensors 236, which may be separate from the frame 211 and attached to the body of the user 306 (e.g., on the head, torso, an extremity, etc. of the user 306). The peripheral sensors 236 may be configured to acquire data characterizing a physiological state of the user 306 in some embodiments (e.g., the sensor 236 may be electrodes, inertial measurement units, accelerometers, compasses, GPS units, radio devices, gyros, and/or other sensors disclosed herein).

With continued reference to FIG. 2A, the head-mounted display system 210 is operatively coupled by communications link 216, such as by a wired or wireless connectivity, to a local data processing module 230 which may be mounted in a variety of configurations, such as fixedly attached to the frame 211, fixedly attached to a helmet or hat worn by the user 306, embedded in headphones, or otherwise removable attached to the user 306 (e.g., in a backpack-style configuration, in a belt-coupling style configuration). In some embodiments, the head-mounted display system 210 includes and/or is in communication with the local data processors and data modules 230. Thus, functions described herein with reference to the head-mounted display system 210 may be partially or fully performed by the local data processing module 230. Similarly, the sensor 236 may be operatively coupled by communications link 235 (e.g., a wired or wireless connectivity) to the local processor and data module 230. The local processor and data module 230 may comprise a hardware processor, as well as digital memory, such as non-volatile memory (e.g., flash memory or hard disk drives), both of which may be utilized to assist in the processing, caching, and storage of data. Optionally, the local processor and data module 230 may include one or more central processing units (CPUs), graphics processing units (GPUs), dedicated processing hardware, among other processing hardware. The data may include data a) captured from sensors (which may be operatively coupled to the frame 211 or otherwise attached to the user 306), such as image capture devices (e.g., cameras 212, 214, 218), microphones (e.g., microphone 217), inertial measurement units, accelerometers, compasses, GPS units, radio devices, gyros, and/or other sensors disclosed herein; and/or b) acquired and/or processed using remote processor and data module 232 and/or remote data repository 234 (including data relating to virtual content), possibly for passage to the display 213 after such processing or retrieval. The local processor and data module 230 may be operatively coupled by communication links 231, 233, 237 such as via a wired or wireless communication links, to the remote processor and data module 232 and remote data repository 234 such that these remote modules 232, 234 are operatively coupled to each other and available as resources to the local processor and data module 230. In some embodiments, the local processor and data module 230 may include one or more of the image capture devices, microphones, inertial measurement units, accelerometers, compasses, GPS units, radio devices, and/or gyros. In some other embodiments, one or more of these sensors may be attached to the frame 211, or may be standalone structures that communicate with the local processor and data module 230 by wired or wireless communication pathways.

With continued reference to FIG. 2A, in some embodiments, the remote processor and data module 232 may comprise one or more processors configured to analyze and process data and/or image information, for instance including one or more central processing units (CPUs), graphics processing units (GPUs), dedicated processing hardware, and so on. In some embodiments, the remote data repository 234 may comprise a digital data storage facility, which may be available through the internet or other networking configuration in a "cloud" resource configuration. In some embodiments, the remote data repository 234 may include one or more remote servers, which provide information, (e.g., information for generating augmented reality content) to the local processor and data module 230 and/or the remote processor and data module 232. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, local processor and data module 230, remote processor and data module 232, and remote data repository 234, for instance via wireless or wired connections.

FIG. 2B illustrates an example user input device 220 (e.g., a hand-held controller) for interacting in an augmented reality session. The user inputs may be received through controller buttons or input regions on the user input device 220. In particular, FIG. 2B illustrates that a controller 220, which may be a part of the head-mounted display system 210 illustrated in FIG. 2A and which may include a home button 222, trigger 228, bumper 226, and touchpad 224. Further, in some embodiments the controller 220 is electromagnetically tracked with the head-mounted display system 210. The controller 220 includes an emitter and the head-mounted display system 210 includes a receiver 219 for electromagnetic tracking.

Potential user inputs that can be received through controller 220 include, but are not limited to, pressing and releasing the home button 222; half and full (and other partial) pressing of the trigger 228; releasing the trigger 228; pressing and releasing the bumper 226; touching, moving while touching, releasing a touch, increasing or decreasing pressure on a touch, touching a specific portion such as an edge of the touchpad 224, or making a gesture on the touchpad 224 (e.g., by drawing a shape with the thumb).

Physical movement of controller 220 and of a head-mounted display system 210 may form user inputs into the system. The head-mounted display system 210 may comprise the head-worn components 211-219 of the head-mounted display system 210. In some embodiments, the controller 220 provides three degree-of-freedom (3 DOF) input, by recognizing rotation of controller 220 in any direction. In other embodiments, the controller 220 provides six degree-of-freedom (6 DOF) input, by also recognizing translation of the controller in any direction. In still other embodiments, the controller 220 may provide less than 6 DOF or less than 3 DOF input. Similarly, the head-mounted display system 210 may recognize and receive 3 DOF, 6 DOF, less than 6 DOF, or less than 3 DOF input.

The user inputs may have different durations. For example, certain user inputs may have a short duration (e.g., a duration of less than a fraction of a second, such as 0.25 seconds) or may have a long duration (e.g., a duration of more than a fraction of a second, such as more than 0.25 seconds). In at least some embodiments, the duration of an input may itself be recognized and utilized by the system as an input. Short and long duration inputs can be treated differently by the head-mounted display system 210. For example, a short duration input may represent selection of an object, whereas a long duration input may represent activation of the object (e.g., causing execution of an app associated with the object).

Example Spectator View System

Figure 3:
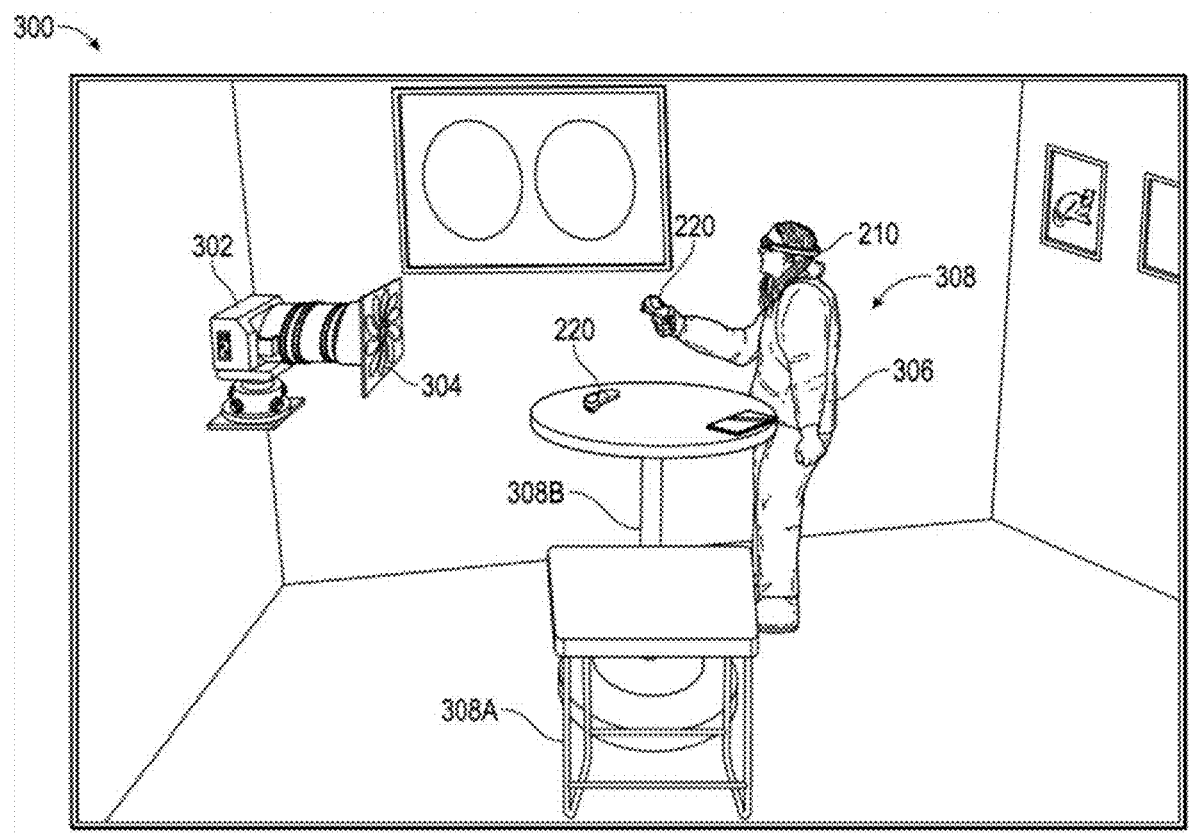
FIG. 3 illustrates an example room view including a spectator camera.

FIG. 3 illustrates an example room view including a spectator camera 302 in a physical environment 308. A localization of the spectator camera 302 (e.g., determining and/or tracking the position and orientation of the spectator camera 302 in a mapped or unmapped environment) is described herein and further illustrated in FIG. 3. The localization of the spectator camera 302 allows the one or more virtual avatars (e.g., the avatar 402 illustrated in FIGS. 4-6) to interact in the AR session in a smooth natural-looking way in reference to real physical objects (e.g., the table 308B and stool 308A), the user 306 (e.g., first person view), and/or the spectator (e.g., third person view). The spectator camera 302 may be stationary (e.g., fixed-location) or dynamic (e.g., moveable). In some embodiments, a plurality of spectator cameras 302 may be used to capture multiple third person spectator views of the AR session.

In some embodiments, the spectator camera 302 is stationary. A stationary spectator camera may only need to be localized once to the head-mounted display system 210 of the user 306 (e.g., the position and orientation of the spectator camera relative to the head-mounted display system is known). The position and orientation of the spectator camera 302 may be localized via image tracking from the head-mounted display system 210. The image tracking may occur by initially using the head-mounted display system 210 to scan the physical environment 308 (e.g., the room) for a physical two-dimensional planar image 304 coupled to a lens cap of the spectator camera 302. When the two-dimensional planar image 304 location is determined by the head-mounted display system 210, a virtual marker (e.g., virtual image tracking box or cube) is generated (e.g., by the head-mounted display system 210) at the position and orientation of the two-dimensional planar image 304. The location of the two-dimensional planar image 304 is relative to the coordinate system of the head-mounted display system 210 that scanned the physical environment 308 and may be stored onto remote data repository 234. In some embodiments, the remote data repository 234 stores one or more mappings for one or more head-mounted display systems 210 that occupy and acquire images of a portion of the physical environment 308. The lifetime of the one or more mappings may coincide with the lifetime of the persistent coordinate frame of the corresponding head-mounted display system 210. In some embodiments, once the two-dimensional planar image 304 location is determined, virtual particle animations and/or virtual annotations (e.g., "image found") are generated by the head-mounted display system 210 on and/or near the virtual marker as further indication that the two-dimensional planar image 304 location is determined.

The physical two-dimensional planar image 304 coupled to the lens cap of the spectator camera 302 may be removed from the spectator camera 302 once the virtual marker is generated. However, the virtual marker will remain fixed in the same position and orientation that it was initially generated at (e.g., the initial position and orientation of the physical two-dimensional planar image 304 coupled to the lens cap of the spectator camera 302 illustrated in FIG. 3). The virtual marker position and orientation is determined as the origin point and gaze direction of the spectator camera 302 relative to a mapping of the virtual environment (e.g., virtual elements 402, 404A-B, and 406A-B illustrated in FIG. 4) based on the position and orientation of the physical environment 308 (e.g., physical elements, 306 and 308). The mapping of the virtual environment is further disclosed herein (e.g., disclosed in description of FIG. 4).

Once the origin point and gaze direction of the spectator camera 302 is determined, the virtual elements displayed from the head-mounted display system 210 may be spatially and temporally synchronized. For example, the remote system 208 (e.g., illustrated in FIG. 1B) may render the virtual elements at three-dimensional positions and orientations with reference to the origin point and gaze direction of the spectator camera 302, instead of from the perspective of the head-mounted display system 210. The remote system 208 may composite the synchronized virtual elements with the live feed and/or recording of the spectator camera 302 to display a stationary third person view of the AR session to one or more spectators on one or more display devices (e.g., the third person spectator camera 302 views shown in FIGS. 5-6). FIG. 7 further illustrates example processes associated with localization of a stationary spectator camera.

In some embodiments, the spectator camera 302 is dynamic (e.g., moveable within the environment, rather than in a fixed location such as the camera 302 in FIG. 3). In some embodiments the dynamic spectator camera may be on a motorized camera mount that may be controlled by the remote system 208 and/or another system to move in three-dimensional space. In some embodiments, the dynamic spectator camera may be controlled by a camera operator (e.g., a "camera man") to move the spectator camera 302 in three-dimensional space.

In some embodiments, the dynamic spectator camera may localize to the head-mounted display system 210 of the user 306 in the same manner as described herein for the stationary spectator camera (e.g., the physical two-dimensional planar image 304 coupled to the lens cap of the spectator camera 302). In some embodiments, the dynamic spectator camera may automatically localize to the head-mounted display system 210 of the user 306 via markerless (e.g., no two-dimensional planar image 304) tracking. The markerless tracking may occur by determining the field of view (FOV) of the spectator camera 302 via the remote system 208 and/or with hardware added to the spectator camera 302. This example dynamic localization system may then track physical objects (e.g., the head-mounted display system 210) found in the environment 308 relative to the FOV of the spectator camera 302 via the remote system 208 and store the tracked location of the head-mounted display system 210 onto remote data repository 234.

In some embodiments, the remote system 208 may track the head-mounted display system 210 by detecting features of the head-mounted display system 210 in the current frame from the dynamic spectator camera feed. Then the remote system 208 may compare and find the corresponding features (e.g., correspondences) of the head-mounted display system 210 in the following frames from the dynamic spectator camera feed. The position and orientation of the spectator camera 302 (e.g., origin point and gaze direction) may be determined based on the determined correspondences (e.g., two features of the head-mounted display system 210 in different frames that are the same features within the environment 308) in position and orientation. In some embodiments, the spectator camera 302 may dynamically adjust and/or move by control of the remote system 208 and/or a camera operator to maintain the head-mounted display system 210 in the FOV of the spectator camera 302.

Once the head-mounted display system 210 is tracked relative to the FOV of the spectator camera 302, the virtual elements displayed from the head-mounted display system 210 may be spatially and temporally synchronized to the remote system 208 (e.g., the virtual element's three-dimensional position, orientation, rig data, and timestamp are synchronized, and re-rendered in reference to the location of the head-mounted display system 210 relative to the origin point and gaze direction of the spectator camera 302). The remote system 208 may composite the synchronized virtual elements with the live feed and/or recording of the spectator camera 302 to display a dynamic third person ("spectator") view of the AR session to one or more spectators on one or more display devices (e.g., the third person spectator camera 302 views shown in FIGS. 5-6). FIG. 7 further illustrates example processes associated with localization of a dynamic spectator camera.

In some embodiments, the spectator camera 302 uses SDI video input/output. The SDI video input/output may support 3840×2160, 1920×1080, and/or other resolution. In one embodiment, the SDI video input/output may be 6G-SDI with timestamp at 10-bit 4:2:2, and use a Deutsches Institut für Normung (DIN) 1.0/2.3 connector. In some embodiments, the spectator camera 302 uses an interchangeable camera lens. The spectator camera lens may be an ultra-wide angle 7-14 mm lens. Additionally the lens may comprise multiple (e.g., 10, 12, 14, or more) individual lens elements comprising one or more extra-low dispersion (ED), super ED, and/or ED aspherical (EDA) elements.

Example Spectator Perspective View

Figure 4:
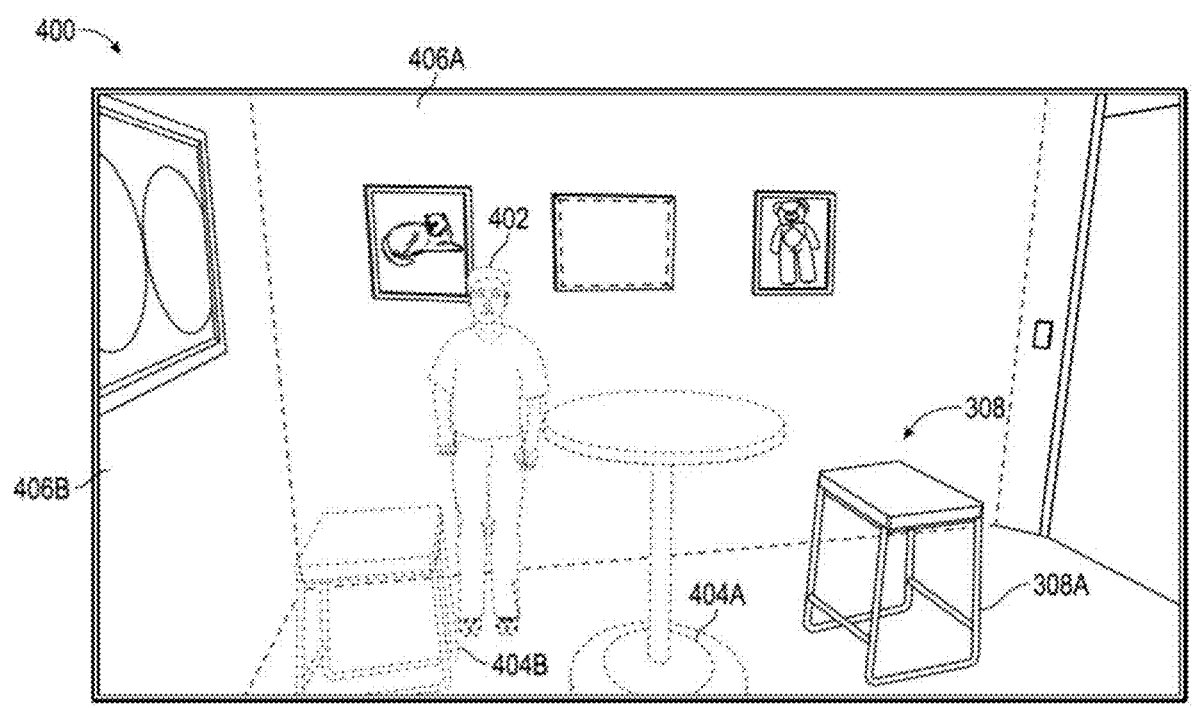
FIG. 4 illustrates an example view of virtual elements from the spectator camera perspective.
Figure 5:
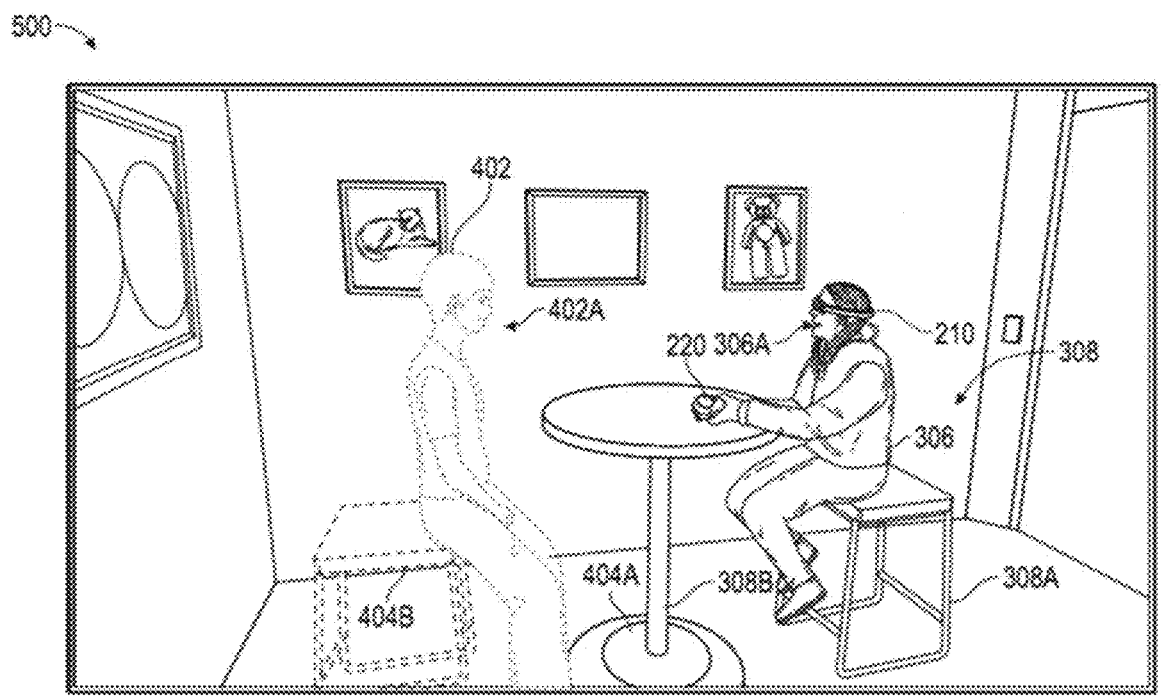
FIG. 5 illustrates an example view of an augmented reality session from the spectator camera perspective.
Figure 6:
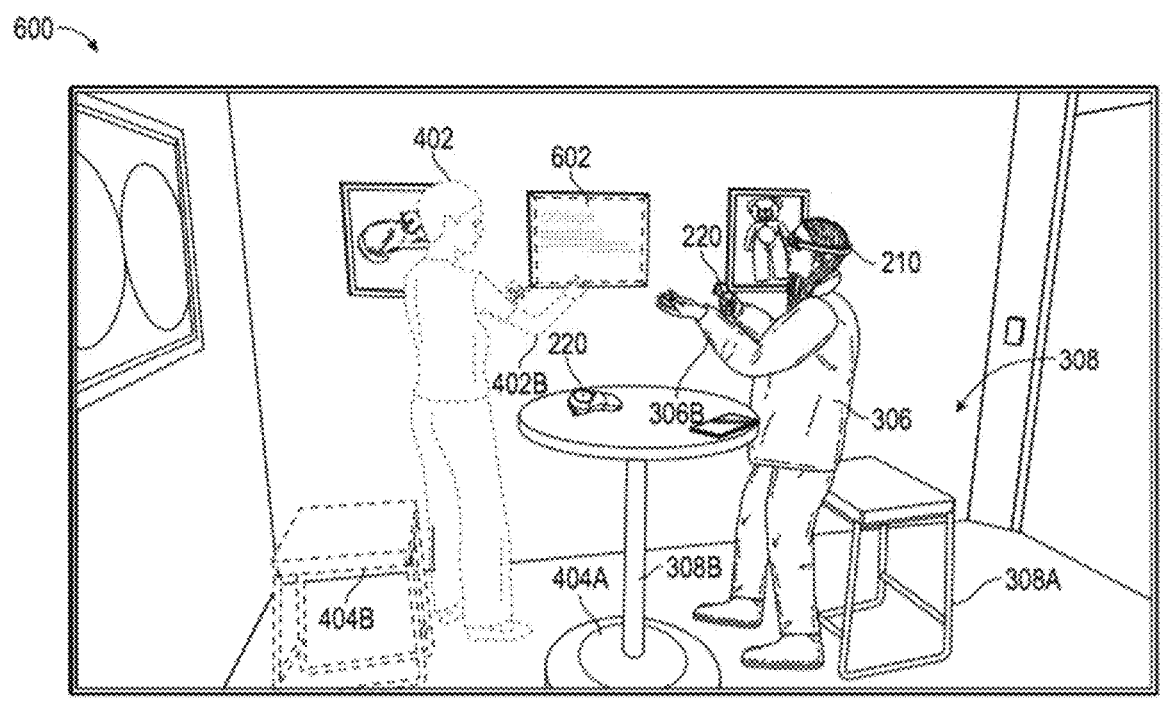
FIG. 6 illustrates an example view of the augmented reality session from the spectator camera perspective.

FIG. 4 illustrates a mapping of virtual elements from the spectator camera 302 perspective (e.g., the same operating environment as FIG. 3 but rotated 90° counter-clockwise for FIGS. 4-6 as the view is from the spectator camera 302 perspective).

In some embodiments, a mapping of virtual elements 402, 404A-B, and 406A-B (e.g., the virtual avatar 402, the virtual table 404A, the virtual stool 404B, and the virtual walls 406A-B) may be generated by rendering and placing masks and/or wire meshes of virtual elements 402, 404A-B, and 406A-B at specific positions and orientations within the physical environment 308 via the remote system 208 and/or the head-mounted display system 210. For example, virtual elements 404A and 406A-B may be rendered and placed at a corresponding physical object position and orientation (e.g., overlaying a physical object) within the physical environment 308 (e.g., the virtual table 404A is placed and rendered at the position and orientation of the physical table 308B shown in FIG. 3). Further, virtual elements 402 and 404B may also be rendered and placed at locations in which physical objects do not exist within the physical environment 308 (e.g., the virtual stool 408B and virtual avatar 402 are placed and rendered at locations where physical objects do not exist within the physical environment 308). In other implementations, additional physical objects may be included in the environment, such as a physical stool onto which the virtual stool 408B is overlaid. The position and orientation of the virtual elements 402, 404A-B, and 406A-B may be included in a mesh of the environment, defined in a map of the environment, and stored in the remote data repository 234.

In some embodiments, the position and orientation of virtual elements that overlay physical objects from the generated map (e.g., virtual table 404A overlays physical table 308B) may be used to generate holdouts via the remote system 208 and/or the head-mounted display system 210. The holdouts may occlude (e.g., hide) at least part of a virtual element in reference to the mapped position and orientation of the overlaid physical object. For example, a virtual avatar 402 may appear to walk around the physical environment 308 naturally as one or more parts of the virtual avatar 402 may be hidden when the virtual avatar 402 is positioned and/or oriented behind certain physical objects (e.g., physical table 308B) within the physical environment 308.

FIG. 5 and FIG. 6 illustrate an augmented reality session from the spectator camera 302 perspective. Further FIGS. 5 and 6 illustrate a virtual avatar 402 interacting with a user 306.

In some embodiments, the virtual avatar 402 may interact with the user 306 in any way that is available to the user via the head-mounted display system 210. For example, any software executed on the head-mounted system 210 to generate an AR experience for the user may be performed in the environment 308 and displayed in a spectator view generated by the remote system 208. Thus, while examples herein display a single user interacting with a single virtual avatar, any combination and quantity of users, avatars, and virtual content may be displayed in a spectator view.

In some embodiments, the virtual avatar 402 interacts with the user 306 based on a prearranged routine and/or scene via the remote system 208 and/or the head-mounted display system 210. For example, the virtual avatar 402 as illustrated in FIG. 5 may sit on a virtual stool 404B and smile 402A at the user 306 and then as illustrated in FIG. 6 stand and gesture 402B at virtual text 602. The prearranged routine and/or scene that the virtual avatar 402 carries out may be stored in the remote data repository 234.

In some embodiments, the virtual avatar 402 may interactively interact with the user 306 and vice versa. For example, as illustrated in FIG. 5, the user 306 may produce a facial expression 306A (e.g., a smile) and the virtual avatar 402 may generate via the head-mounted display system 210 and/or remote system 208 a distinct or identical facial expression 402A in response. Further, as illustrated in FIG. 6, the user 306 may produce a gesture 306B (e.g., pointing at virtual text 602) and the virtual avatar 402 may generate via the head-mounted display system 210 and/or remote system 208 a distinct or identical gesture 402B in response.

In some embodiments, the virtual avatar 402 may be controlled by a puppeteer (e.g., a spectator that is viewing the spectator view or the user 306). In some embodiments, the puppeteer may control facial expressions, gestures, and/or body movements of the virtual avatar 402 via a user input device 220. In some embodiments, the puppeteer may be tracked by the spectator camera 302 via the remote system 208 such that the avatar 402 may mirror the facial expressions, gestures, and body movements of the puppeteer. A basis vector may be determined by the remote system 208 via the tracking such that the virtual avatar 402 (e.g., the head of the virtual avatar 402) is oriented according to relative offsets of the puppeteer in relation to the spectator camera 302. For example, if the puppeteer gazes above the virtual avatar 402, then the virtual avatar 402 will gaze above the user 306. In some embodiments, the puppeteer control methods described herein can blend seamlessly allowing the puppeteer to transition from one control method to another without the user 306 and/or spectator becoming aware of that change.

In some embodiments, the virtual avatar 402 interacts with the spectator and/or acknowledges the existence of the spectator by using the determined position and orientation of the spectator camera 302 via the remote system 208. The virtual avatar 402 may then gaze and/or gesture, among other interactions, as described herein in with the spectator.

Example Spectator View Processes

Figures 7A, 7B:
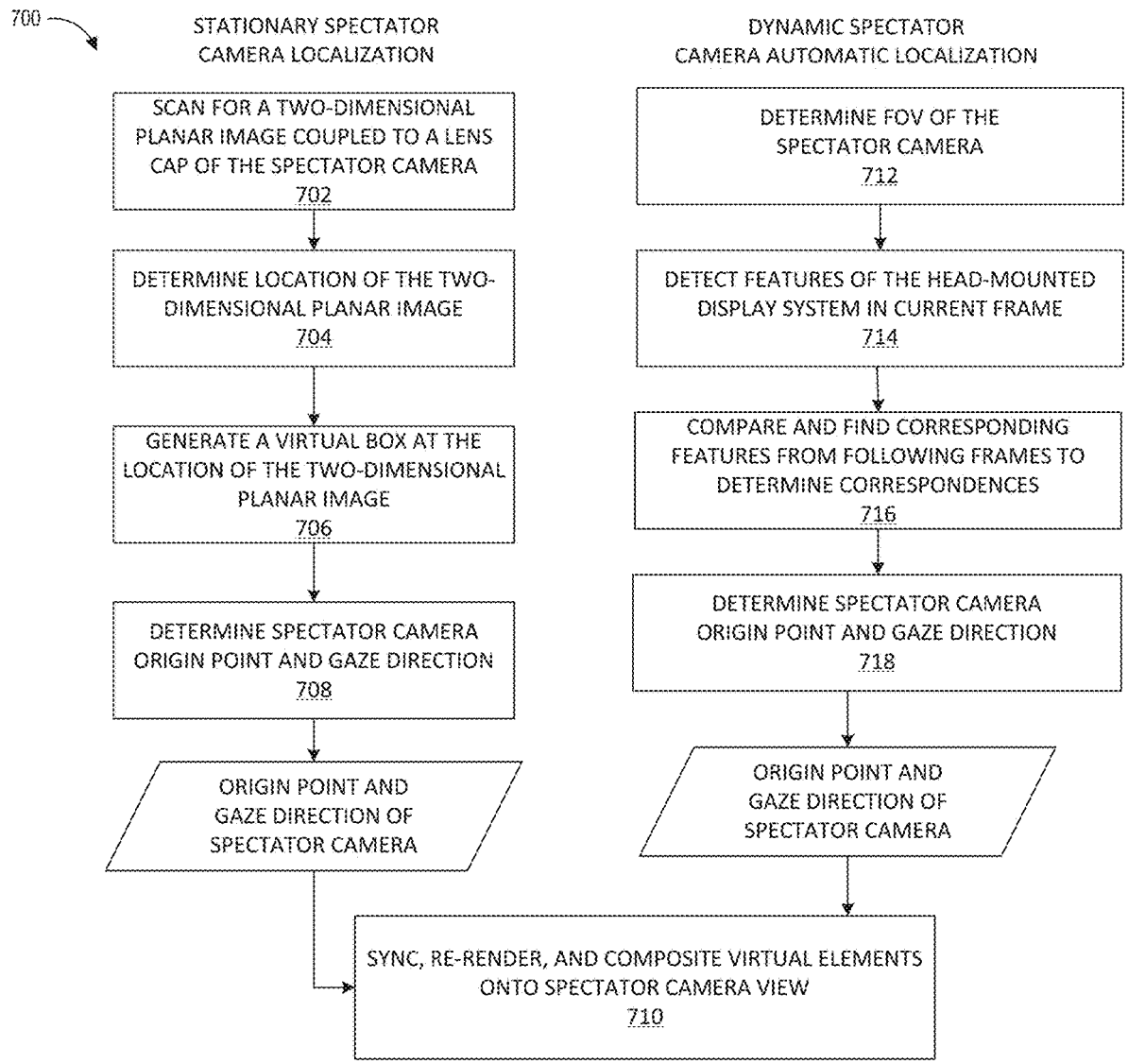
FIGS. 7A and 7B are flowcharts illustrating example processes of localizing a spectator camera.

FIG. 7A and FIG. 7B are flowcharts illustrating example processes of localizing a stationary spectator camera (FIG. 7A) and a dynamic spectator camera (FIG. 7B) in an augmented reality session. Depending on the embodiment, the method of FIGS. 7A and 7B may include fewer or additional blocks and the blocks may be performed in an order that is different than illustrated.

Beginning with the stationary spectator camera localization example at block 702, a physical environment 308 is scanned for a two-dimensional planar image 304 coupled to a lens cap of the spectator camera 302. In some embodiments, the image 304 may be fixed to another known location relative to the spectator camera 302. The scanning may be performed, for example, by a head-mounted display system 210 as a user 306 moves and/or looks around the environment 308. Any other suitable method for identifying the distinguishable characteristic associated with a camera (e.g., the spectator camera 302) may be used, such as utilizing computer vision, visual odometry, and/or a fiducial.

Moving to block 704, the location of the two-dimensional planar image 304 is determined by the head-mounted display system 210 and stored via the remote data repository 234.

Next at block 706, a virtual marker is generated via the head-mounted display system 210 at the location of the two-dimensional planar image 304. Moving to block 708, the origin point and gaze direction of the spectator camera is determined based on the virtual marker orientation and position. As shown in FIG. 7A, this origin point and gaze direction of the spectator camera is then provided to the remote system 208 for use in synchronizing and rendering the virtual content of the environment from the provided origin point and gaze direction. This virtual content may then be composited and synchronized with the video feed from the spectator camera to provide a composite spectator view that may be viewable on one or more display devices.

At block 710, with the origin point and gaze direction of the spectator camera 302 identified, attributes of the virtual elements currently displayed in the head-mounted display system 210 and the video feed from the spectator camera 302 are received by the remote system 208, which may generate a composite view of the environment to display as a spectator view on one or more displays. In some embodiments, the remote system 208 synchronizes and re-renders the virtual content (e.g., one or more virtual avatars with associated rig data and/or virtual objects) from the origin point and gaze direction of the spectator camera before compositing with the spectator camera video. Thus, the virtual content is rendered from the same reference point as the spectator camera. Accordingly, in the stationary spectator camera implementations, the origin point and gaze direction may be determined only once and usable for rendering of content within the environment so long as the camera remains in the precise location as when the localization was performed. In some embodiments, the origin point and gaze direction may periodically be re-determined.

In embodiments where the spectator camera is movable, the origin point and gaze direction of the spectator camera may be determined dynamically on an ongoing basis, such as at every frame of video recorded by the spectator camera (or other frequency, such as every 0.1, 0.2, 0.5, 1.0 seconds or every n frames). In some implementations, this dynamic localization may be performed by additional sensors that are included in and/or are attached to a spectator camera. For example, a specialized localization device, such as including one or more additional cameras (e.g., two wide-angle lenses spaced apart to allow depth determinations anywhere within the overlapping field-of-view) may be configured to determine the precise three-dimensional position and gaze direction of the spectator camera with reference to a real-world environment as it is moved about the environment. In other embodiments, other combinations of sensors and software may be used to dynamically determine position of a movable spectator camera. FIG. 7B illustrates one example process of determining position and orientation of a dynamic spectator camera.

Referring now to the dynamic spectator camera localization example at block 712, the dynamic spectator camera may be automatically localized by first determining the FOV of the spectator camera 302.

Moving to block 714, the features of the head-mounted display system 210 are determined in the current frame of the spectator camera 302 feed via markerless tracking by the remote system 208 and stored via the remote data repository 234.

Moving to block 716, the remote system 208 compares and finds the corresponding features (e.g., correspondences) of the head-mounted display system 210 in the following frames from the spectator camera 302 feed.

At block 718, the spectator camera 302 origin point and gaze direction is determined based on the determined correspondences (e.g., two features of the head-mounted display system 210 in different frames that are the same features within the environment 308) position and orientation.

In some implementations, the remote system 208 may dynamically determine if the head-mounted display system 210 is in the FOV of the spectator camera 302 and, if so, run image processing algorithms (e.g., object removal and inpainting) to remove the head-mounted display system 210 of the user 306 from one or more frames from the spectator view video feed and replace the head-mounted display system 210 of the user 306 with representations of the face of the user 306.

In some implementations, the remote system 208 may dynamically determine if the head-mounted display system 210 is in the FOV of the spectator camera 302 and, if so, run image processing algorithms (e.g., matting) to apply a holdout mask of the user 306 from one or more frames from the spectator view video feed. The holdout mask of the user 306 may be applied against any virtual avatars 406 or objects the user 306 may occlude.

In some implementations, the remote system 208 may dynamically determine if the head-mounted display system 210 is in the FOV of the spectator camera 302 and, if not, the spectator camera 302 may dynamically move such that the head-mounted display system is in the FOV of the spectator camera 302. The movement of the spectator camera 302 may be automatic (e.g. controlled by robotics) or manually (e.g. controlled by a camera person).

This process of determining the origin point and gaze direction of the spectator camera may be performed repeatedly (e.g., each n frames of video) to provide the origin point and gaze direction of the dynamic spectator camera for use in generating the composite spectator view video feed. The remote system 208 may be configured to receive and/or request updated origin point and gaze direction information from any specialized hardware (e.g., the example add-on sensor components with additional cameras mentioned above) periodically for use in determining a current re-render position and orientation. Similar to FIG. 7A, at block 710 the re-rendered virtual content may then be composited and synchronized with the video feed from the dynamic spectator camera to provide a composite spectator view that may be viewable on one or more display devices.

Depending on the embodiment, the method of FIGS. 7A and 7B may output the composited spectator camera view to one or more spectator displays 102 (e.g., monitors, televisions, tablets, phones, head-mounted display systems among other like spectator viewing displays).

EXAMPLE IMPLEMENTATIONS

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example One: A system comprising: a camera positioned in an environment to capture images of a user of an augmented reality (AR) head-mounted display system within the environment; an AR head-mounted display system configured to: determine an origin point in an environment coordinate system and gaze direction of the camera; determine rig data of a virtual avatar; a remote computing system configured to: receive a video feed from the camera; receive the rig data of the virtual avatar from the AR head-mounted display system; receive the origin point and gaze direction of the camera with reference to the environment from the AR head-mounted display system; render the virtual avatar from the origin point and gaze direction of the camera; composite the rendered virtual avatar on the video feed to generate a spectator view video feed of the environment; and transmit the spectator view video feed to one or more display devices; and a display device configured to receive and render the spectator view video feed.

Example Two: The system of Example One, wherein said determining the origin point and gaze direction of the camera with reference to the environment comprises: scanning the environment with an imaging device of the AR head-mounted display system for a known two-dimensional planar image; determining the two-dimensional planar image location with reference to the environment coordinate system; determining the camera origin point and gaze direction based on the determined location.

Example Three: The system of Example One, wherein said determining the origin point and gaze direction of the camera with reference to the environment comprises: receiving, from a localization device coupled to the camera, a real-time location information of the camera with reference to the environment coordinate system; and determining the camera origin point and gaze direction based on the received real-time location information.

Example Four: The system of Example Three, wherein the localization device comprises two or more imaging devices.

Example Five: The system of Example One, wherein the camera communicates with the remote computing system via a serial digital interface (SDI).

Example Six: The system of Example One, wherein a lens of the camera comprises a plurality of individual lens elements comprising extra-low dispersion (ED), super ED, and ED aspherical (EDA) elements.

Example Seven: A method, performed by an augmented reality (AR) head-mounted display system having one or more hardware computer processors and one or more non-transitory computer readable storage devices storing software instructions executable by the AR head-mounted display system to: access images of an environment obtained from an outward-facing camera of the AR head-mounted display system; scan the images for a known two-dimensional planar image at a fixed position with reference to a camera; determine a location of the two-dimensional planar image with reference to a world coordinate system; generate a virtual marker at the determined location of the two-dimensional planar image; determine a camera origin point and gaze direction based at least on the virtual marker; transmit the determined camera origin point and gaze direction to a remote computing system configured to: render one or more virtual elements of the environment from the origin point and gaze direction; composite the rendered virtual elements and a video feed from the camera to generate a spectator view video feed of the environment; and transmit the spectator view video feed to one or more display devices.

Example Eight: The method of Example Seven, wherein the two-dimensional planar image is coupled to a lens of the camera.

Example Nine: The method of Example Seven, wherein the virtual marker is a virtual cube or virtual box.

Example Ten: The method of Example Seven, wherein the virtual marker comprises virtual particle animations.

Example Eleven: The method of Example Seven, wherein the virtual marker comprises virtual annotations.

Example Twelve: The method of Example Seven, wherein the camera is stationary.

Example Thirteen: The method of Example Seven, wherein the one or more virtual elements comprise a virtual avatar.

Example Fourteen: The method of Example Thirteen, wherein the virtual avatar interacts with a user of the AR head-mounted display system by at least one of a prearranged routine, an interactive interaction, or a puppeteer.

Example Fifteen: A computerized method, performed by a computing system having one or more hardware computer processors and one or more non-transitory computer readable storage device storing software instructions executable by the computing system to perform the computerized method comprising: accessing images of an environment from a camera; determining a field of view of the camera within the environment; detecting a feature of an augmented reality (AR) head-mounted display system for a first frame; comparing the detected feature of the first frame with a corresponding feature of a second frame; determining correspondences based on the compared first frame and second frame; determining a camera origin point and gaze direction of the camera in the environment based on the correspondences; receiving, from an augmented reality (AR) head-mounted display, rig data associated with one or more virtual elements in the environment; rendering the virtual elements from the determined camera origin point and gaze direction; compositing the rendered virtual elements with a video feed from the camera to generate a composite video feed of the environment.

Example Sixteen: The method of Example Fifteen, wherein the camera is moveable.

Example Seventeen: The method of Example Sixteen, wherein the dynamic camera is operated by a camera operator.

Example Eighteen: The method of Example Sixteen, wherein the dynamic camera is controlled by a motorized camera mount.

Example Nineteen: The method of Example Fifteen, wherein the virtual elements comprise a virtual avatar.

Example Twenty: The method of Example Fifteen, further comprising:

transmitting the composite video feed to one or more display devices.

As noted above, implementations of the described examples provided above may include hardware, a method or process, and/or computer software on a computer-accessible medium.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments described herein may be embodied within a form that does not provide all of the features and benefits set forth herein, as some features may be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a camera positioned in an environment to capture images of a user of an augmented reality (AR) head-mounted display system within the environment;
an AR head-mounted display system configured to:
determine an origin point in an environment coordinate system and gaze direction of the camera;
determine rig data of a virtual avatar;
a remote computing system configured to:
receive a video feed from the camera;
receive the rig data of the virtual avatar from the AR head-mounted display system;
receive the origin point and gaze direction of the camera with reference to the environment from the AR head-mounted display system;
render the virtual avatar from the origin point and gaze direction of the camera;
composite the rendered virtual avatar on the video feed to generate a spectator view video feed of the environment; and
transmit the spectator view video feed to one or more display devices; and
a display device configured to receive and render the spectator view video feed.

2. The system of claim 1, wherein said determining the origin point and gaze direction of the camera with reference to the environment comprises:
scanning the environment with an imaging device of the AR head-mounted display system for a known two-dimensional planar image;
determining the two-dimensional planar image location with reference to the environment coordinate system;
determining the camera origin point and gaze direction based on the determined location.

3. The system of claim 1, wherein said determining the origin point and gaze direction of the camera with reference to the environment comprises:
receiving, from a localization device coupled to the camera, a real-time location information of the camera with reference to the environment coordinate system; and
determining the camera origin point and gaze direction based on the received real-time location information.

4. The system of claim 3, wherein the localization device comprises two or more imaging devices.

5. The system of claim 1, wherein the camera communicates with the remote computing system via a serial digital interface (SDI).

6. The system of claim 1, wherein a lens of the camera comprises a plurality of individual lens elements comprising extra-low dispersion (ED), super ED, and ED aspherical (EDA) elements.

7. A method, performed by an augmented reality (AR) head-mounted display system having one or more hardware computer processors and one or more non-transitory computer readable storage devices storing software instructions executable by the AR head-mounted display system to:
access images of an environment obtained from an outward-facing camera of the AR head-mounted display system;
scan the images for a known two-dimensional planar image at a fixed position with reference to a camera;
determine a location of the two-dimensional planar image with reference to a world coordinate system;
generate a virtual marker at the determined location of the two-dimensional planar image;
determine a camera origin point and gaze direction based at least on the virtual marker;
transmit the determined camera origin point and gaze direction to a remote computing system configured to:
render one or more virtual elements of the environment from the origin point and gaze direction;
composite the rendered virtual elements and a video feed from the camera to generate a spectator view video feed of the environment; and
transmit the spectator view video feed to one or more display devices.

8. The method of claim 7, wherein the two-dimensional planar image is coupled to a lens of the camera.

9. The method of claim 7, wherein the virtual marker is a virtual cube or virtual box.

10. The method of claim 7, wherein the virtual marker comprises virtual particle animations.

11. The method of claim 7, wherein the virtual marker comprises virtual annotations.

12. The method of claim 7, wherein the camera is stationary.

13. The method of claim 7, wherein the one or more virtual elements comprise a virtual avatar.

14. The method of claim 13, wherein the virtual avatar interacts with a user of the AR head-mounted display system by at least one of a prearranged routine, an interactive interaction, or a puppeteer.

15. A computerized method, performed by a computing system having one or more hardware computer processors and one or more non-transitory computer readable storage device storing software instructions executable by the computing system to perform the computerized method comprising:
accessing images of an environment from a camera;
determining a field of view of the camera within the environment;
detecting a feature of an augmented reality (AR) head-mounted display system for a first frame;
comparing the detected feature of the first frame with a corresponding feature of a second frame;
determining correspondences based on the compared first frame and second frame;

determining a camera origin point and gaze direction of the camera in the environment based on the correspondences;

receiving, from an augmented reality (AR) head-mounted display, rig data associated with one or more virtual elements in the environment;

rendering the virtual elements from the determined camera origin point and gaze direction;

compositing the rendered virtual elements with a video feed from the camera to generate a composite video feed of the environment.

16. The method of claim 15, wherein the camera is moveable.

17. The method of claim 16, wherein the moveable camera is operated by a camera operator.

18. The method of claim 16, wherein the moveable camera is controlled by a motorized camera mount.

19. The method of claim 15, wherein the virtual elements comprise a virtual avatar.

20. The method of claim 15, further comprising:

transmitting the composite video feed to one or more display devices.

* * * * *